(12) United States Patent
Kim

(10) Patent No.: US 8,156,346 B2
(45) Date of Patent: Apr. 10, 2012

(54) KEYBOARD-INPUT INFORMATION-SECURITY APPARATUS AND METHOD

(75) Inventor: Yong Hoon Kim, Gyeonggi-do (KR)

(73) Assignee: Kings Information and Network, Seoul (KR)

( * ) Notice: Subject to any disclaimer, the term of this patent is extended or adjusted under 35 U.S.C. 154(b) by 416 days.

(21) Appl. No.: 12/410,403

(22) Filed: Mar. 24, 2009

(65) Prior Publication Data

US 2010/0185876 A1 Jul. 22, 2010

(30) Foreign Application Priority Data

Jan. 20, 2009 (KR) ........................ 10-2009-0004782

(51) Int. Cl.
*G06F 21/00* (2006.01)
(52) U.S. Cl. ........................... 713/190; 726/22; 719/321
(58) Field of Classification Search .................. 713/190; 726/22; 719/321
See application file for complete search history.

(56) References Cited

U.S. PATENT DOCUMENTS

| | | | | |
|---|---|---|---|---|
| 6,192,442 B1 * | 2/2001 | Haren et al. | ................... | 710/269 |
| 6,216,183 B1 * | 4/2001 | Rawlins | ........................ | 710/100 |
| 7,774,595 B2 * | 8/2010 | Chung Geon et al. | ........ | 713/154 |
| 7,797,251 B2 * | 9/2010 | Smith | ............................. | 705/72 |
| 8,056,124 B2 * | 11/2011 | Bassett et al. | .................... | 726/11 |
| 2005/0177649 A1 * | 8/2005 | Chung Geon et al. | ............ | 710/1 |
| 2010/0138918 A1 * | 6/2010 | Kim et al. | ........................ | 726/22 |
| 2010/0228994 A1 * | 9/2010 | Kang | ............................ | 713/189 |

FOREIGN PATENT DOCUMENTS

| | | |
|---|---|---|
| KR | 1020010099090 | 11/2001 |
| KR | 1020020048313 | 6/2002 |
| KR | 1020040009575 | 1/2004 |
| KR | 1020040066237 | 7/2004 |
| KR | 1020040092101 | 11/2004 |
| KR | 1020060097548 | 9/2006 |

OTHER PUBLICATIONS

Intel, Intel 64 adn IA-32 Architecture, May 2007.*

\* cited by examiner

*Primary Examiner* — Jung Kim
*Assistant Examiner* — Shan Elahi
(74) *Attorney, Agent, or Firm* — Charles A. Lemaire; Lemaire Patent Law Firm, P.L.L.C.

(57) ABSTRACT

A keyboard-input information-security apparatus and method are provided. The apparatus includes an interrupt-descriptor table for storing a list of addresses of functions for handling interrupts, and storing an address of a secure input interrupt-service routine at a specific location in an address area for an operating-system input interrupt-service routine supported by an operating system; a secure input-device driver for changing keyboard-interrupt-vector information to invoke the address of the secure input interrupt-service routine when a keyboard interrupt is generated by a keyboard, and receiving and encoding data input via the keyboard based on the address of the secure input interrupt-service routine; and a secure input unit for delivering the encoded data from the secure input-device driver to an application program, thereby providing higher-level security than a conventional keyboard-security scheme, and particularly, effectively blocking a port-polling attack or an action trying to change a setting in a debug register.

17 Claims, 12 Drawing Sheets

FIG. 3

```
PVOID
MmMapIoSpace (
        IN PHYSICAL_ADDRESS  PhysicalAddress,
        IN ULONG  NumberOfBytes,
        IN MEMORY_CACHING_TYPE  CacheType
);
```

(a)

```
PVOID
MmUnmapIoSpace(
        IN PVOID BaseAddress,
        IN SIZE_T NumberOfBytes
);
```

| NAME OF REGISTERS | PURPOSE OF REGISTERS |
|---|---|
| DR0 ~ DR3 | Breakpoint Address Register |
| DR6 | Debug Status Register |
| DR7 | Debug Control Register |

FIG. 11

| FIELD VALUE | ACTION CONDITION FOR EXCEPTION HANDLING OCCURRENCE |
|---|---|
| 00 | Break on instruction execution only |
| 01 | Break on data writes only |
| 10 | Break on I/O reads or writes |
| 11 | Break on data reads or writes but not instruction fetches |

FIG. 12

| FIELD VALUE | MONITORING SCOPE AT EXCEPTION HANDLING OCCURRENCE LOCATION |
|---|---|
| 00 | 1 byte length |
| 01 | 2 bytes length |
| 10 | Undefined |
| 11 | 4 bytes length |

KEYBOARD-INPUT INFORMATION-SECURITY APPARATUS AND METHOD

CROSS-REFERENCE TO RELATED APPLICATION

This application claims priority to and the benefit of Korean Patent Application No. 10-2009-0004782, filed on Jan. 20, 2009, the disclosure of which is incorporated herein by reference in its entirety.

BACKGROUND

Field of the Invention

1. Field of the Invention

The present invention relates to a keyboard-input information-security apparatus and method, and particularly, to a keyboard-input information-security apparatus and method that are capable of effectively blocking keyboard-input information from being taken by hacking with an information-intrusion tool while the keyboard-input information is being processed, and particularly, blocking a port-polling attack or an action trying to change a setting in a debug register.

2. Discussion of Related Art

As computers and the Internet have been recently developing, important online financial transactions such as Internet banking or securities trading are conducted by web browsers or a client software such as home trading system (HTS). However, personal data can be compromised by spyware or a key-stroke logger which intercept user data.

There are schemes to prevent the above-mentioned hacking attempts: antivirus, anti-spyware and personal firewall. However, these tools are not effective in dealing with fast-evolving variants of malicious programs.

To solve this problem, schemes by which a system receives input data and safely delivers the input data to a target application program to prevent malicious programs from intercepting the input data have been introduced.

Examples of such schemes include following references: Korean Patent Laid-open Publication No. 2002-48313 entitled "Method For Preventing Keyboard Hacking," Korean Patent No. 0378586 entitled "Anti Keylog Method of ActiveX Base and Equipment Thereof," Korean Patent Laid-open Publication No. 2004-92101 entitled "Apparatus And Method For Hacking Protection Using Virtual Data Transmission," Korean Patent Laid-open Publication No. 2004-66237 entitled "Method For Protecting From Keystroke Logging," and Korean Patent No. 0447777 entitled "Hacking Prevention of Key Stroke Data."

Korean Patent No. 0378586 is a representative example. This patent discloses a scheme for intercepting window-input-message information and protecting input data on the same level as an application program. However, the security capability of this scheme may be neutralized by use of a filter driver for intercepting input data earlier than a security-device driver or by use of a hacking program for receiving input data in a lower step such as an interrupt-service routine.

A computer-security system using a secure input-device driver to solve this problem is disclosed in Korean Patent Laid-open Publication No. 2003-36276. In the system, data input via a data-input device is directly encoded by the secure input-device driver, not by an operating system's input-device driver, thereby essentially preventing hacking programs from illegally acquiring the data input via the data-input device.

However, the system has technical vulnerability. For example, the system may be incapacitated by a method for registering an address of a security interrupt-service routine in an interrupt-descriptor table, for example, through a security interrupt-service-routine registration method, and then registering the address as an interrupt-service-routine address for illegal data acquisition.

A more recent issue includes a port-polling attack, which suppresses a keyboard interrupt and then reads a port. Even when a key is input, an interrupt is not generated in a central processing unit (CPU) due to the port-polling attack. That is, a keyboard-security function registered in an interrupt-descriptor table is not invoked.

Since a debug register set to defend against a PS/2(PS-2 keyboard) port-polling attack may be accessed and changed by anyone, functionality of maintaining/protecting a set configuration is required. That is, there is a need for a security solution capable of blocking an action trying to change a setting in a debug register while keyboard security is active.

Thus, there is a need for a system capable of overcoming shortcomings of the scheme disclosed in Korean Patent Laid-open Publication No. 2003-36276 to maintain effective security in implementing a computer-security apparatus, such as using the scheme described in the present invention.

SUMMARY OF THE INVENTION

The present invention is directed to a keyboard-input information-security apparatus and method capable of effectively blocking keyboard-input information from being taken by hacking with an information-intrusion tool while the keyboard-input information is being processed, and particularly, blocking a port-polling attack or an action trying to change a setting in a debug register.

According to an aspect of the present invention, there is provided a keyboard-input information security apparatus including: an interrupt-descriptor table for storing a list of addresses of functions for handling interrupts, and storing an address of a secure input interrupt-service routine at a specific location in an address area for an operating-system input interrupt-service routine supported by an operating system; a secure input-device driver for changing keyboard-interrupt-vector information to invoke the address of the secure input interrupt-service routine when a keyboard interrupt is generated by a keyboard-input device, and receiving and encoding data input via the keyboard-input device based on the address of the secure input interrupt-service routine; and a secure input unit for delivering the encoded data from the secure input-device driver to an application program.

The secure input-device driver may include: a data receiver for receiving the data input from the keyboard-input device when the keyboard interrupt is generated by the keyboard-input device; an encoder for encoding the data received by the data receiver; a monitor for monitoring a change in the address of the secure input interrupt-service routine that is registered in the interrupt-descriptor table; and a controller for changing the keyboard-interrupt-vector information to invoke the address of the secure input interrupt-service routine when the keyboard interrupt is generated by the keyboard-input device, and controlling operation of the secure input-device driver.

The address of the secure input interrupt-service routine may be an address of the data receiver.

The monitor may monitor a change in the keyboard-interrupt-vector information and access to a keyboard input/output port.

The secure input-device driver may set a GD (thirteenth) bit of a debug register DR7 among debug registers DR0 to DR7 to a specific value and set a keyboard input/output port in at least one of registers DR0 to DR3 in order to defend against a port-polling attack, and when a security-exception handler is registered in a vector number of the interrupt-descriptor table corresponding to the specific value and the debug register is accessed, an exception may occur and the registered security-exception handler may be invoked, and the security-exception handler may analyze the debug register DR6 among the debug registers, determine whether an accessing program is an authorized program or an unauthorized program depending on association with the GD bit, and control to permit or block the access depending on the determination result.

When bit BD (the thirteenth bit) of the debug register DR6 among the debug registers has been set to the specific value as a result of analyzing the register DR6, the security-exception handler may trace a program accessing the debug register back to determine whether the accessing program is an authorized program or an unauthorized program, and block the access to the debug register when the accessing program is an unauthorized program, and when at least one of bits B0 to B3 (bit zero to bit three) of the debug register DR6 has been set to the specific value, the security-exception handler may trace a program accessing a keyboard input/output port back to determine whether the accessing program is an authorized program or an unauthorized program, and control to change a port-access value into another value when the accessing program is an unauthorized program.

The specific value may be "1" and the security-exception handler may be set in vector 1 of the interrupt-descriptor table.

According to another aspect of the present invention, there is provided a keyboard-input information-security method including: storing an address of a secure input interrupt-service routine at a specific location in an address area for an operating-system input interrupt-service routine supported by an operating system in an interrupt-descriptor table that stores a list of addresses of functions for handling interrupts; and changing keyboard-interrupt-vector information to invoke the address of the secure input interrupt-service routine when a keyboard interrupt is generated by a keyboard-input device, and executing the secure input interrupt-service routine based on the address of the secure input interrupt-service routine previously registered in the interrupt-descriptor table, wherein the secure input interrupt-service routine comprises fetching and encoding data input by the keyboard-input device.

The method may further include monitoring a change in the address of the secure input interrupt-service routine registered previously in the interrupt-descriptor table.

The method may further include decoding the encoded data and transmitting the decoded data to an application program.

The method may further include monitoring a change in the keyboard-interrupt-vector information and access to a keyboard input/output port.

The method may further include setting a GD (thirteenth) bit of a debug register DR7 among debug registers DR0 to DR7 to a specific value, setting a keyboard input/output port in at least one of registers DR0 to DR3, and registering a security-exception handler in a vector number of the interrupt-descriptor table corresponding to the specific value, in order to defend against a port-polling attack, wherein an exception may occur and the registered security-exception handler may be invoked when the debug register is accessed, and wherein the security-exception handler may analyze the debug register DR6 among the debug registers, determine whether an accessing program is an authorized program or an unauthorized program depending on association with the GD bit, and permit or block the access depending on the determination result.

When bit BD (the thirteenth bit) of the debug register DR6 among the debug registers has been set to the specific value as a result of analyzing the register DR6, the security-exception handler may trace a program accessing the debug register back to determine whether the accessing program is an authorized program or an unauthorized program, and block the access to the debug register when the accessing program is an unauthorized program, and when at least one of bits B0 to B3 (bit zero to bit three) of the debug register DR6 has been set to the specific value, the security-exception handler may trace a program accessing a keyboard input/output port back to determine whether the accessing program is an authorized program or an unauthorized program, and change a port access value into another value when the accessing program is an unauthorized program.

The specific value may be "1" and the security-exception handler may be set in vector 1 of the interrupt-descriptor table.

According to a still another aspect of the present invention, there is provided a computer-readable recording medium having a program for performing the above method recorded thereon.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 3 illustrates an example of functions for mapping a physical address of a register to a virtual address in order to access a redirection table of an interrupt controller, in which FIG. 3a illustrates a function used upon mapping and FIG. 3b illustrates a function used upon unmapping;

FIG. 9 is a table showing purposes of the debug registers;

FIG. 11 illustrates a read/write field defined in a debug register DR7;

FIG. 12 illustrates a length field defined in the debug register DR7; and

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 1:
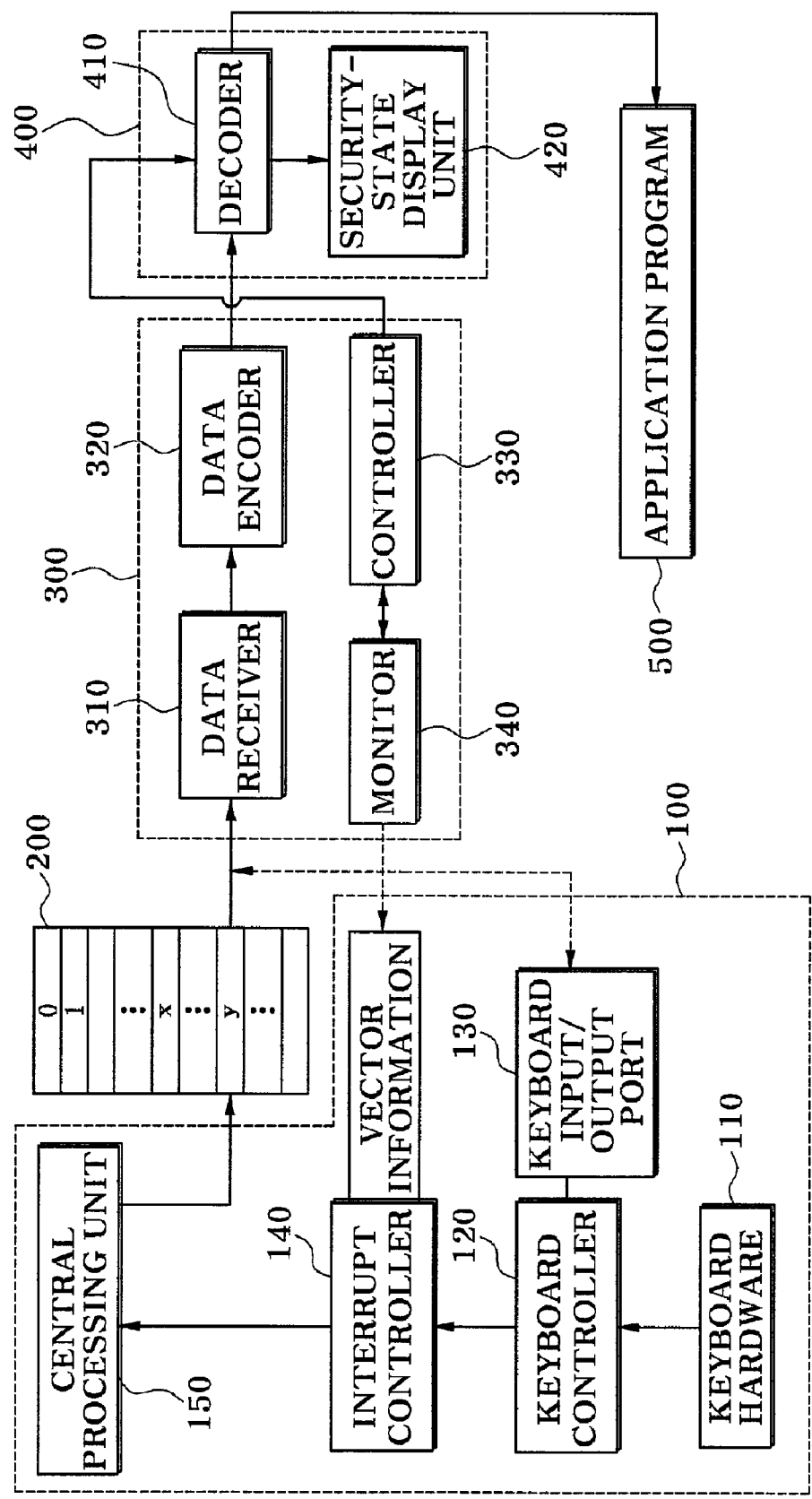
FIG. 1 is a schematic diagram illustrating a keyboard-input information-security apparatus according to an exemplary embodiment of the present invention.

FIG. 1 is a schematic diagram illustrating a keyboard-input information-security apparatus according to an exemplary embodiment of the present invention.

Referring to FIG. 1, the keyboard-input information-security apparatus according to an exemplary embodiment of the present invention is intended to protect data input from a keyboard input device 100, and includes an interrupt-descriptor table (IDT) 200, a secure input-device driver 300, and a secure input unit 400.

Here, the keyboard-input device 100 is a user-interface device widely used in a personal computer (PC) for receiving keyboard data, but is not limited thereto. For example, the keyboard-input device 100 may be a user-interface device for a mouse or a joystick.

This keyboard-input device 100 includes keyboard hardware 110, a keyboard controller 120, a keyboard input/output port 130, an interrupt controller 140, and a central processing unit (CPU) 150.

Operation of the keyboard-input device 100 having such a configuration will now be described. First, when any key of the keyboard hardware 110 is pressed (a key-press event), an electric signal is generated and delivered to an 8042 chip set on a main board. Since all keys of the keyboard hardware 110 are disposed on intersections of a matrix structure, a pressed key can be recognized by checking horizontal and vertical lines on which a change in current occurs.

The keyboard controller 120 for controlling the 8042 chip set writes keyboard-input information, as keyboard-scan code, to the bidirectional keyboard input/output port 130, which is used to deliver the keyboard-input information to the CPU 150 or receive a hardware-control instruction delivered from the CPU 150, and generates an interrupt to the CPU 150.

The bidirectional keyboard input/output port 130 includes ports 60h and 64h. The port 60h is used to process the keyboard-input information and the hardware-control instruction and the port 64h is used to manage a state of the port 60h and issue an instruction for the port 60h.

Meanwhile, the interrupt refers to temporarily halting any ongoing process and causing the CPU 150 to perform task processing.

That is, when receiving the electric signal generated by physical keyboard input, the keyboard controller 120 requests the interrupt controller 140, which controls the 8259 chip set, to generate an interrupt.

The interrupt controller 140 informs the CPU 150 of generation of the interrupt (Interrupt Request, IRQ), and the CPU 150 reads an interrupt-vector table, i.e., the interrupt-descriptor table 200, from a memory and obtains an address value (or a value of a vector number) corresponding to the generated interrupt in order to invoke a corresponding interrupt-handling function (i.e., an interrupt handler).

This address value is a value of an address at which is stored a function that is invoked when the interrupt is generated. When the keyboard hardware 110 requests the CPU 150 to perform any computation or task, the CPU moves to the address and performs the interrupt-handling function. The interrupt-handling function recorded in the interrupt-descriptor table 200 may be considered to be first performed in connection with computation associated with the keyboard hardware 110.

The interrupt-descriptor table 200 stores a list of addresses of functions for handling interrupts, and particularly, stores an address of a secure input interrupt-service routine at a specific location in an address area for an operating-system input interrupt-service routine supported by an operating system.

The interrupt-descriptor table 200 is an area provided by the operating system of the system for storing a list of addresses of functions for handling external interrupts, internal interrupts, and exception handling. For example, the interrupt-descriptor table 200 is one 8-byte array in a memory assigned for 256 interrupt-service routines. In this case, the first 32 entries may be used for processor exception handling, another 16 entries may be used for hardware interrupts (i.e., external interrupts), and the remainder may be used for soft interrupts (i.e., internal interrupts).

An address of the interrupt-descriptor table 200 is stored in a processor register called an "interrupt descriptor table register." For details of a relationship between the interrupt-descriptor table 200 and the interrupt-descriptor table register, "IA-32 Intel Architecture Software Developer's Manual Volume 3, System Programming Guide" (which is incorporated herein by reference) may be referred to.

Meanwhile, when data is input via the keyboard-input device 100, an interrupt is generated and an identification number for the keyboard-input device 100 is generated. This identification number is called an "interrupt vector." The operating system uses the interrupt vector as an index to discover an interrupt-service-routine address from the interrupt-descriptor table 200 and execute an interrupt-service routine that is a function created according to its purpose.

In this case, the secure input-device driver 300 according to an exemplary embodiment of the present invention changes keyboard-interrupt-vector information (e.g., a value of a vector number) stored in the interrupt controller 140 of the keyboard-input device 100. An address of a secure input interrupt-service routine executed by the secure input-device driver 300 is registered and stored at a specific location of an input interrupt-service routine address area supported by a conventional operating system, i.e., a location corresponding to the keyboard-interrupt-vector number changed by the secure input-device driver 300 in the interrupt-descriptor table 200.

Accordingly, when the keyboard-input information-security apparatus is in an activated state, according to an exemplary embodiment of the present invention, when data is input to the keyboard-input device 100 and an interrupt is generated, the value of the keyboard-interrupt-vector number (which is changed by the secure input-device driver 300) is transmitted to the CPU 150. Through this process, the operating-system input interrupt-service routine supported by the operating system is not executed, but instead, the secure input interrupt-service routine supported by the secure input-device driver 300 is executed.

The secure input-device driver 300 receives the data via the keyboard-input device 100 based on the address of the secure input interrupt-service routine previously registered in the interrupt-descriptor table 200, encodes the data, and transmits the encoded data to the secure input unit 400.

The secure input unit 400 decodes the encoded data from the secure input-device driver 300 into the original data, and delivers the decoded original data to an application program 500. When the data has been decoded, the secure input unit 400 displays an indication that decoding is completed. For example, the secure input unit 400 may indicate to a user whether the security apparatus is operating normally using a tray icon.

In the exemplary embodiment of the present invention, the secure input unit 400 decodes the encoded data into original data and delivers the original data to the application program 500. However, in an actual implementation, the application program 500 may perform decoding or a specific server may perform decoding on encoded information delivered via the Internet.

For example, there may be a variety of implementation methods to meet a requirement of displaying a key value on a screen for the application program 500. A key value of a password may be displayed as "*" on the screen for the application program 500.

The secure input-device driver 300 will now be described in greater detail.

The secure input-device driver 300 includes a data receiver 310, a data encoder 320, and a controller 330. The secure input-device driver 300 may further include a monitor 340, if needed. The monitor 340 monitors a change in an address of the data receiver 310 registered in the interrupt-descriptor table 200, a change in the keyboard-interrupt-vector information stored in the interrupt controller 140, or access to the keyboard input/output port 130. A function and role of the monitor 340 will be described in detail later.

When an interrupt is generated by the keyboard-input device 100, the data receiver 310 fetches the data input via the keyboard-input device 100 and transmits the data to the data encoder 320.

The data encoder 320 encodes the data received from the data receiver 310 and transmits the encoded data to the secure input unit 400. That is, since the data input via the keyboard-input device 100 is encoded directly by the secure input-device driver 300, not by the operating-system's input-device driver, and transmitted to the secure input unit 400, a hacking program fails to acquire the original input data or acquires the previously encoded data from the data encoder 320.

Preferably, the data is encoded using a 128-bit encryption scheme using a Rijndael algorithm that is a standard algorithm of the advanced encryption standard (AES) in the U.S. The Rijndael algorithm has excellent performance in security, processing speed, and memory utilization. This algorithm is merely one example, and it will be easily appreciated that any conventional excellent encryption algorithm may be used.

The controller 330 may be configured to control the monitor 340 and the data encoder 320 and may also control the decoder 410 of the secure-input unit 400. In an actual implementation, the secure input unit 400 may separately include the controller 330.

That is, the controller 330 controls general operation of the secure input-device driver 300, and particularly, functions to change the value of the keyboard-interrupt-vector number stored in the interrupt controller 140 of the keyboard input device 100, so that the address of the secure input interrupt-service routine previously registered in the interrupt-descriptor table 200 is invoked when a keyboard interrupt is generated by the keyboard-input device 100.

The secure input unit 400 includes a decoder 410 for decoding the encoded data from the secure input-device driver 300 into original data, and a security-state display unit 420 for indicating that the data has been decoded and displaying an indication as to whether the security apparatus is operating normally.

The security-state display unit 420 is configured to operate when the decoder 410 delivers the decoded data to the application program 500. For example, an image of a tray icon or an icon included in the application program may be changed to indicate to the user that the input data is under protection.

Figure 2:
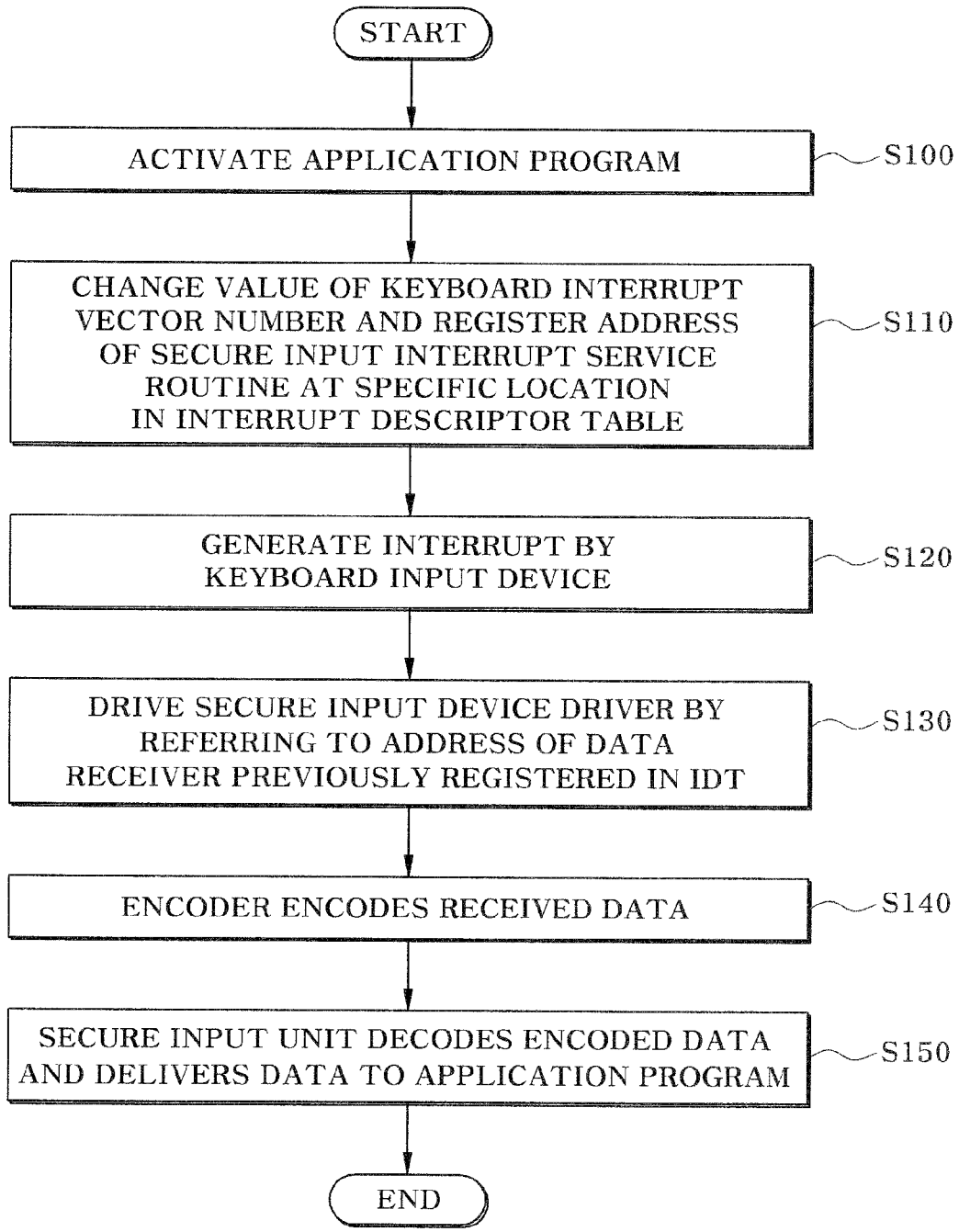
FIG. 2 is a flowchart illustrating a method for protecting data input via a keyboard-input device in a keyboard-input information-security apparatus of the present invention.

Operation of the keyboard-security apparatus according to an exemplary embodiment of the present invention will now be briefly described with reference to FIGS. 2 and 5. FIG. 2 is a flowchart illustrating a method for protecting data input via a keyboard-input device in the keyboard-input information-security apparatus of the present invention. It is noted that the method is performed by the controller 330 of the secure input-device driver 300, unless mentioned otherwise.

Referring to FIG. 2, after the application program 500 is activated (S100), the secure input-device driver 300 analyzes the keyboard-interrupt-vector information stored in the interrupt controller 140, changes a value of the keyboard-interrupt-vector number into a previously set value, and registers an address of a secure input interrupt-service routine, which is an address of the data receiver 310, in an address area for an operating-system input interrupt-service routine of the interrupt-descriptor table 200 corresponding to the changed value of the keyboard-interrupt-vector number (S110).

The value of the keyboard-interrupt-vector number of the interrupt controller 140 may be changed as follows:

The interrupt controller 140 is an on-board chip, i.e., an IO advanced programmable interrupt controller (IO-APIC) for collectively managing interrupts for various hardware connected to the system. The interrupt controller 140 manages interrupts of a variety of devices, such as a mouse, an ISA, and a PCI, as well as the keyboard, using a redirection table (having a total of 24 entries, each consisting of 64 bits).

Respective interrupt-handling configurations for a variety of devices managed by the IO-APIC are stored in the redirection table. The value of the keyboard-interrupt-vector number to be delivered when the keyboard interrupt is generated to the CPU 150 is also stored in the redirection table.

The redirection table may be accessed via two registers, i.e., an IOREGSEL register (having physical address 0xFEC0xy00; a basic address 0xFEC00000) and an IOWIN register (having physical address 0xFEC0xy10; a basic address 0xFEC00010).

Meanwhile, the physical addresses of the IOREGSEL and IOWIN registers should be mapped to corresponding virtual addresses in order to access the registers. Functions as shown in FIG. 3 are used to map the physical address to the virtual address.

FIG. 3 illustrates functions for mapping the physical address of the register to the virtual address in order to access the redirection table of the interrupt controller. FIG. 3a illustrates a function used upon mapping and FIG. 3b illustrates a function used upon unmapping.

The IOREGSEL (I/O register select) register serves as an indicator for designating an index of an interrupt device to be accessed among a variety of interrupt devices. Accordingly, information on an interrupt device selected by the indicator can be accessed via the IOWIN register.

Figure 4:
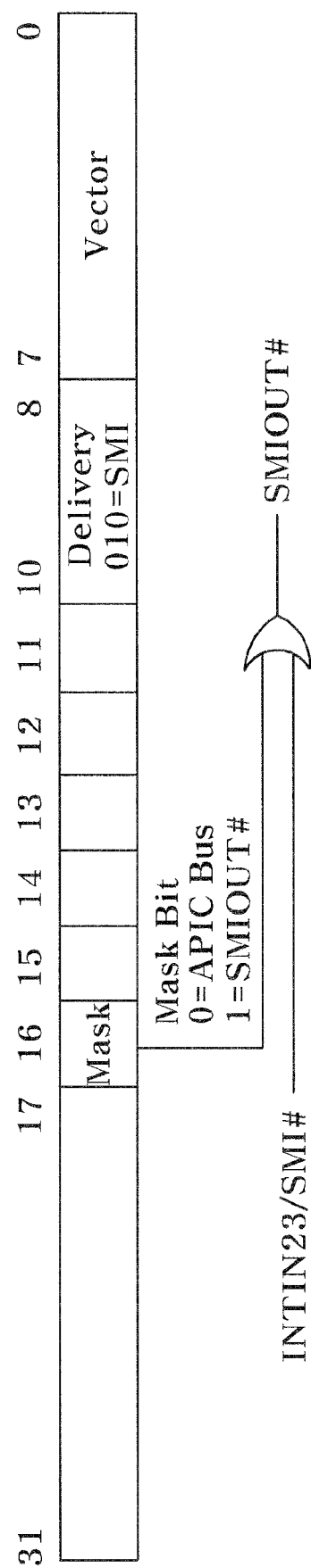
FIG. 4 illustrates an entry structure of a redirection table that is accessed through an IOWIN register.

For example, when an index of the keyboard hardware 110 is set through the IOREGSEL register, an entry of the redirection table for the keyboard may be referred to through the IOWIN register. FIG. 4 illustrates an entry structure of the redirection table that is accessed through the IOWIN register. Each entry consists of 64 bits, and the lower 32 bits of the entry are shown in FIG. 4.

As shown in FIG. 4, the value of the keyboard-interrupt-vector number is stored in lower bits 0 to 7. This value of the keyboard-interrupt-vector number may be changed to a previously set value to change the value of the keyboard-interrupt-vector number that the interrupt controller 140 delivers to the CPU 150.

When an interrupt is generated by the keyboard-input device 100 (S120), the operating system drives the data receiver 310 of the secure input-device driver 300 by referring to the address of the data receiver 310 previously registered in the interrupt-descriptor table 200 based on the changed value (S130).

That is, when the interrupt is generated by the keyboard-input device 100, the operating system executes the data receiver 310, which is the security interrupt-service routine, instead of executing an interrupt-service routine of a typical operating-system input-device driver, and receives data input via the keyboard-input device 100.

The data encoder 320 then encodes the data received from the data receiver 310 (S140) and transmits the encoded data to the secure-input unit 400. The secure-input unit 400 decodes the encoded data from the secure input-device driver 300 into original data and delivers the original data to the application program 500 (S150).

Figure 5:
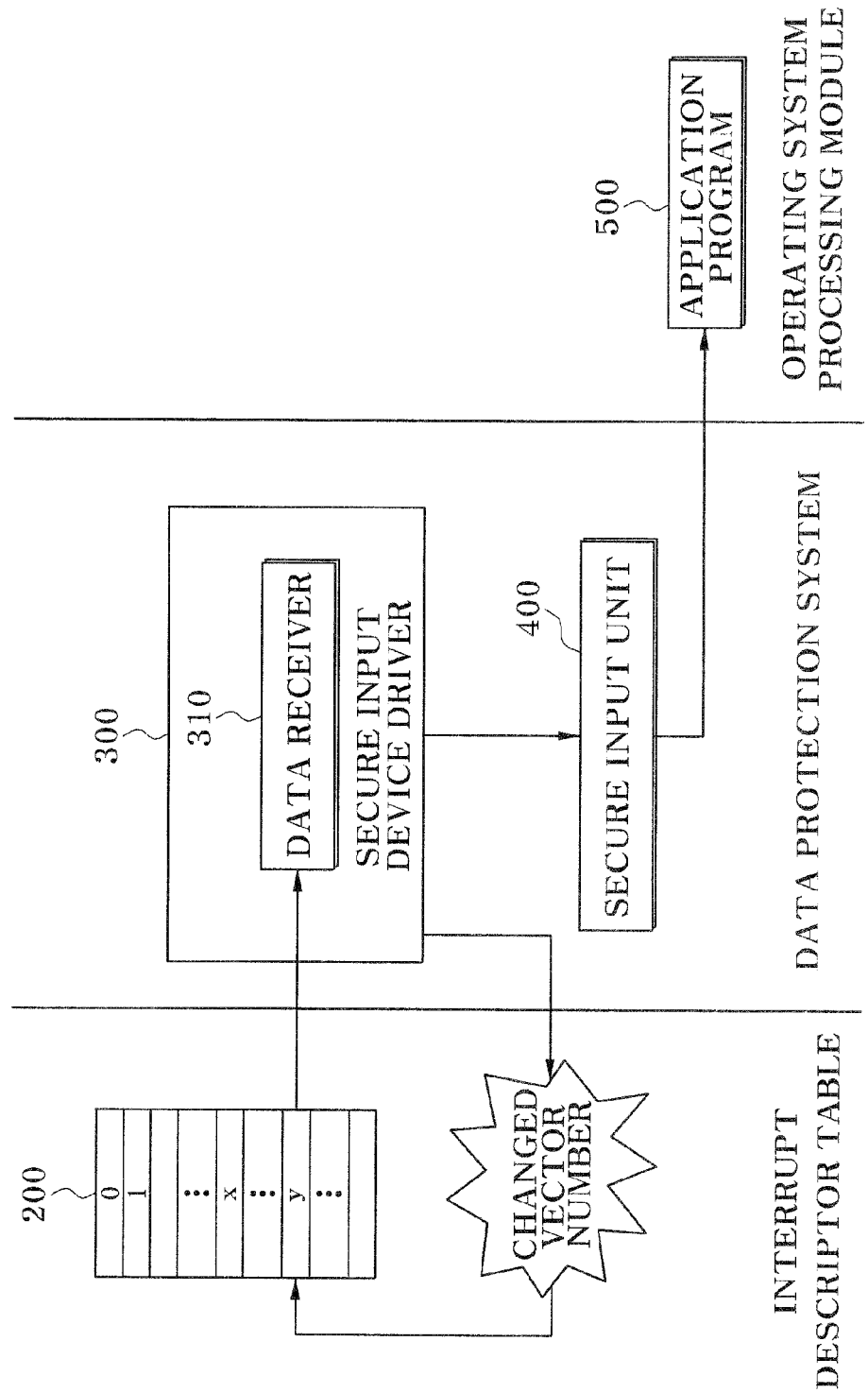
FIG. 5 is a data-flow diagram for explaining a method for protecting data input via a keyboard-input device according to an exemplary embodiment of the present invention.

FIG. 5 is a data-flow diagram for explaining a method for protecting data input via the keyboard-input device according to an exemplary embodiment of the present invention. The data input from the keyboard-input device 100 is processed directly by the secure input interrupt-service routine for data security, not by the operating-system input interrupt-service routine.

In other words, in the keyboard-input information-security apparatus according to an exemplary embodiment of the present invention, a data-protection system first operates earlier than an operating-system processing module. This makes it possible to prevent hacking programs from illegally acquiring the data input via the keyboard-input device 100 even when a number of such hacking programs are installed on an upper level.

A role of the monitor 340 (see FIG. 1) in the keyboard-input information-security apparatus according to an exemplary embodiment of the present invention will now be described in greater detail. The monitor 340 is an optional component for reinforcing security. The monitor 340 monitors a change in the address of the data receiver 310 that is previously registered in the interrupt-descriptor table 200, and examines integrity of the security interrupt-service routine.

Figure 6:
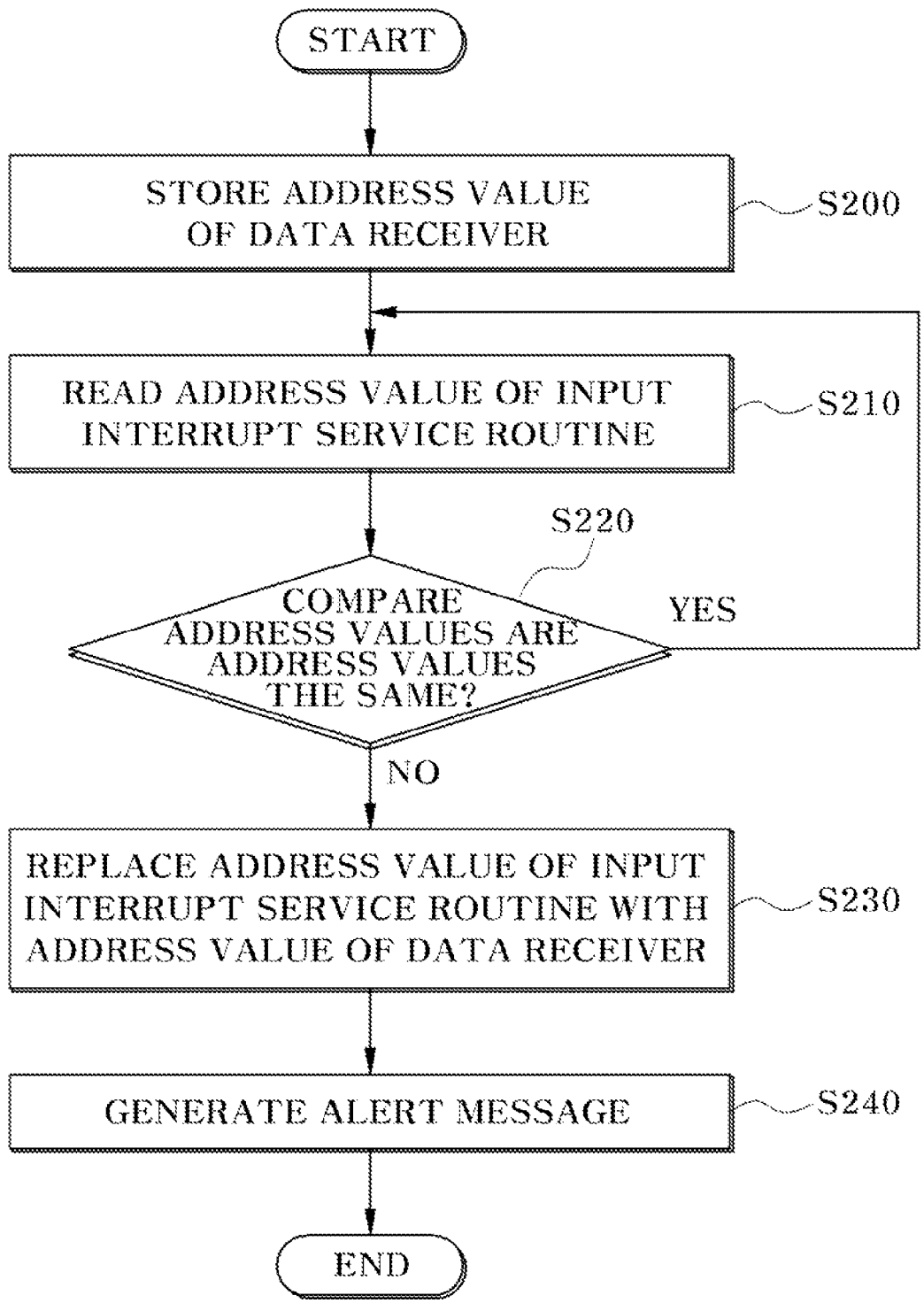
FIG. 6 is a flowchart illustrating a monitoring operation of a monitor according to an exemplary embodiment of the present invention.

FIG. 6 is a flowchart illustrating a monitoring operation of the monitor according to an exemplary embodiment of the present invention. In FIG. 1, a method by which the monitor 340 monitors a change in the address of the data receiver 310 previously registered in the interrupt-descriptor table 200 method is illustrated.

Referring to FIGS. 1 and 6, the monitor 340 stores the address value of the data receiver 310 in advance (S200) and reads the address value from the input interrupt-service routine area of the interrupt-descriptor table 200 (S210).

The monitor 340 then compares the previously stored address value of the data receiver 310 with the input interrupt-service-routine address value (S220). When the two address values are the same, the monitor 340 repeatedly performs steps S210 and S220. However, when the two address values differ, which means that the address value of the data receiver 310 registered in the interrupt-descriptor table 200 is illegally changed, for example, by a hacking program, the monitor 340 replaces the changed address in the input interrupt-service-routine area of the interrupt-descriptor table 200 with the address value of the data receiver 310 (S230).

The monitor 340 notifies the controller 330 of the fact. The controller 330 then displays a predetermined alert message on a screen of a user terminal to inform the user of the fact (S240).

In addition, the monitor 340 may monitor a change in the keyboard-interrupt-vector information stored in the interrupt controller 140 of the keyboard-input device 100, and may monitor access to the keyboard input/output port 130 in the manner of FIG. 6.

A method for further reinforcing security in addition to changing the value of the keyboard-interrupt-vector number and registering the security interrupt-service routine in the address area of the interrupt-descriptor table corresponding to the changed keyboard-interrupt-vector number, as described above, will now be described in detail.

Figure 7:
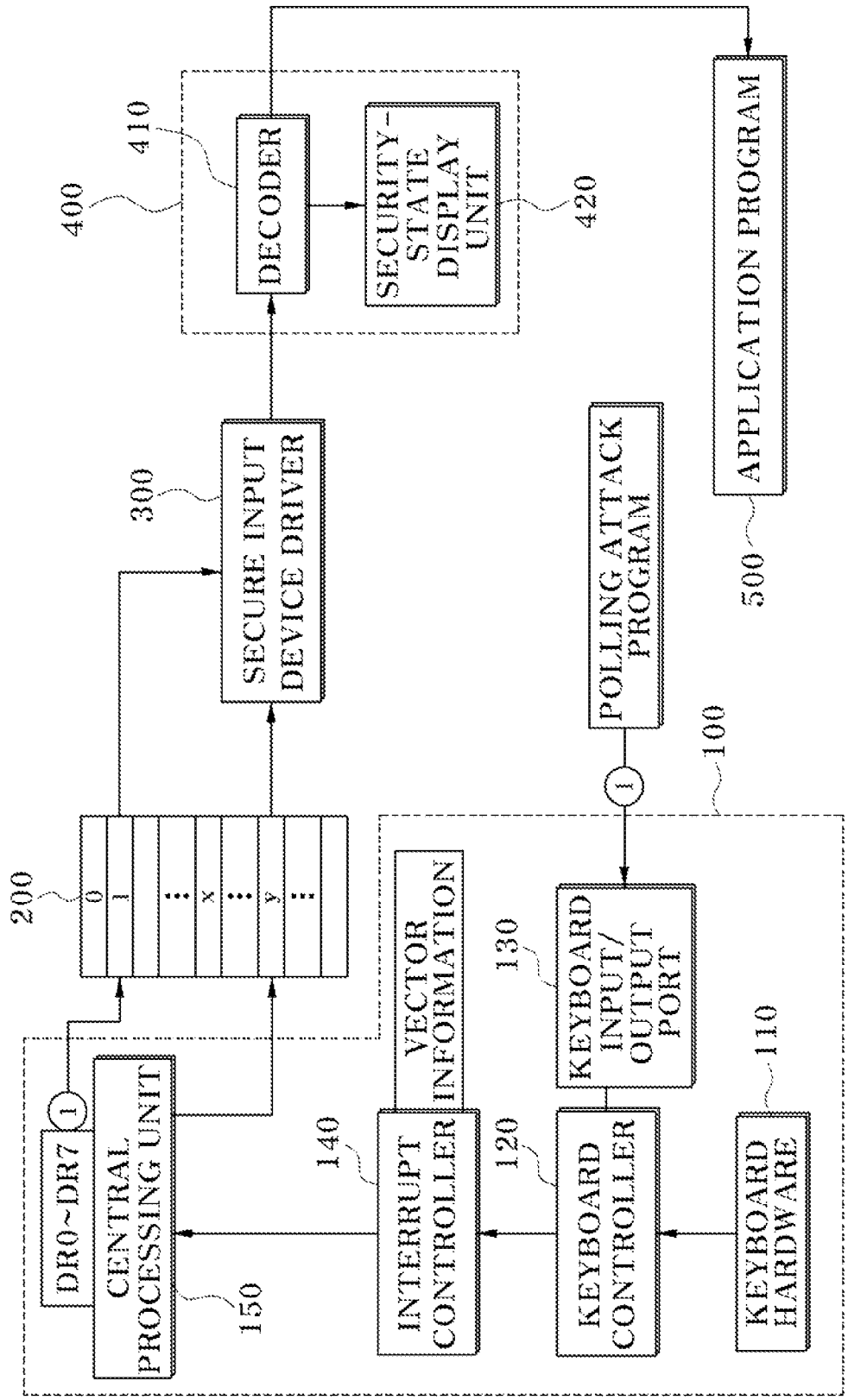
FIG. 7 is a conceptual diagram for explaining security deteriorated by port scanning the keyboard input/output port.

FIG. 7 is a conceptual diagram for explaining security deteriorated by port scanning the keyboard input/output port. A security solution to data acquisition using port scanning, which is a method for confirming input data by iteratively reading a port 60$h$ for input/output (I/O) of a keyboard or a mouse through a port-polling attack, e.g., port scanning, is required.

Figure 8:
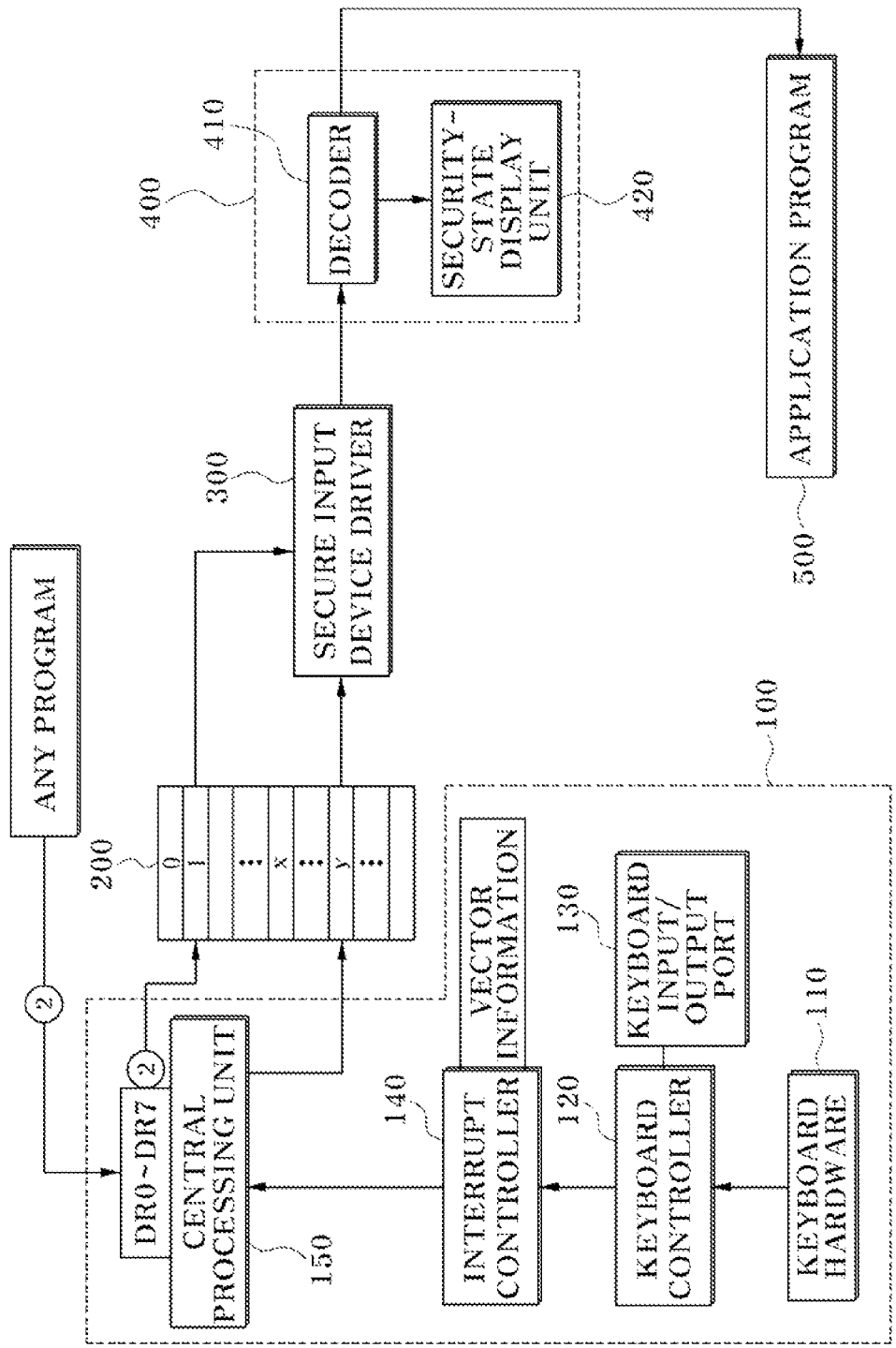
FIG. 8 is a conceptual diagram for explaining security deteriorated by changing a set value in a debug register.

FIG. 8 is a conceptual diagram for explaining security deteriorated by changing a set value in the debug register. The value of the debug register set to defend against a PS/2 port-polling attack may be easily changed by anyone. Accordingly, a security solution for preventing anyone from accessing and changing the debug register with the keyboard security being active is required.

The debug register will first be described in detail. "Debug exception" refers to an error generated during program execution. Processing such an error and preventing abnormal program termination is called exception handling.

For debug-exception handling, a determination is made as to whether debug-exception handling is performed, and an object and scope of debug-exception handling are defined. The determination as to whether debug-exception handling is performed is made and the object and scope of debug-exception handling are defined by adjusting field values of specific control and debug registers.

The control registers include fields (e.g., a flag or a data field) for controlling operation on a system level. The control registers determine the nature of an ongoing task or an operational environment and include control registers CR0 to CR4. The determination as to whether debug-exception handling is performed may be made by setting "CR4 BIT 3=SET".

Meanwhile, the object and scope of debug-exception handling are defined by adjusting field values of debug registers for setting a debug-exception-occurrence breakpoint and a debug-exception-occurrence condition, such as debug registers DR0 to DR7. In general, the debug-exception-occurrence breakpoint refers to a location where a system developer desires to halt an ongoing program and recognize a state of a memory or an input/output port.

Figure 10:
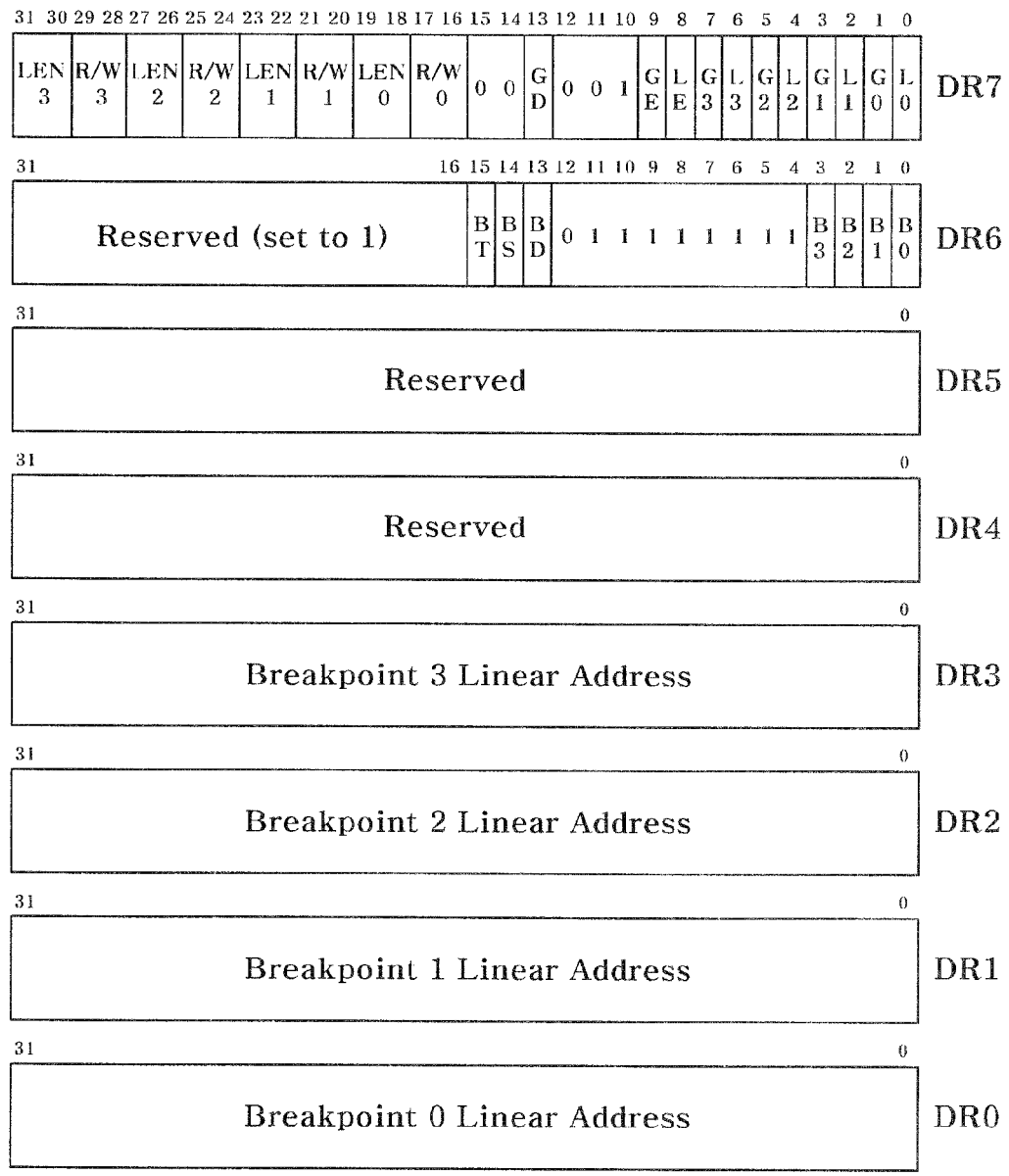
FIG. 10 illustrates configurations of the debug registers.

FIG. 9 is a table showing purposes of the debug registers, and FIG. 10 illustrates configurations of the debug registers. The debug-exception-handling object is set in the debug registers DR0 to DR4, and the debug-exception-handling condition is set by adjusting a read/write field and a length field in DR7. The read/write field defines an action condition for exception-handling occurrence, and the length field is used to set a monitoring scope in an exception-handling-occurrence location.

FIG. 11 illustrates the read/write field defined in the debug register DR7, and FIG. 12 illustrates the length field defined in the debug register DR7. In order to define the debug-exception-handling object and scope in the keyboard input/ output port 130 (see FIG. 1), the debug registers are set as follows: "DR0=00000060h (the debug-exception-handling object is set to the keyboard port 60*h*)", "DR1=00000064h (the debug-exception-handling object is set to keyboard port 64*h*)", and "DR7=220007F0h (Read/Write2=3, Length2=0, and read/write access to an object specified in DRO is confirmed from 2 bytes::Read/Write3=3, Length3=0, and read/write access to an object specified in DR1 is confirmed from 2 bytes)." (Note that hexadecimal numbers are sometimes denoted with a prefix of 0x and other times with a suffix of h—for example an 8-digit hexadecimal zero can be written either 0x00000000 or 00000000h.)

Since the debug register set to defend against a PS/2 port-polling attack as shown in FIGS. 7 and 8 may be accessed and changed by anyone, in some embodiments functionality for maintaining and protecting a set configuration is required. In an exemplary embodiment of the present invention, a GD (thirteenth) bit of the register DR7 is used.

When the GD bit is set as a specific value (preferably, "1"), an exception occurs upon accessing the debug register DR0 to DR7, and a security-exception handler previously registered in a specific vector number (preferably, vector 1) corresponding to the specific value of the interrupt-descriptor table 200 is invoked.

The invoked security-exception handler determines whether an accessing program is an authorized program. When the accessing program is an authorized program, the invoked security-exception handler permits the access, and otherwise, the security-exception handler blocks the access.

Meanwhile, when the security-exception handler registered previously in the specific vector number of the interrupt-descriptor table 200 is invoked, association with the GD bit may be recognized based on information set in the debug register DR6.

If bit BD (the thirteenth bit) of the debug register DR6 has been set to a specific value (preferably, "1") as a result of reading the debug register DR6 when the function registered previously in the specific vector number of the interrupt-descriptor table 200, i.e., the security-exception handler is invoked, it means that someone has accessed the debug register after the GD bit of the register DR7 has been set.

That is, when the GD bit of the register DR7 has been set to "1" and the debug register is accessed through a MOV instruction, bit BD of the debug register DR6 is set to "1" and an exception occurs.

On the other hand, if bit B0 (bit zero) of the debug register DR6 has been set as a specific value (preferably, "1"), it means exception occurs due to the address set in the register DR0. DR0 to DR3 match with bits B0 to B3 (bit zero to bit three) of the debug register DR6 in one-to-one correspondence, respectively.

That is, bits B0 to B3 of the debug register DR6 indicate whether a break is generated while which of linear addresses set in the registers DR0 to DR3 is being accessed. If a break is generated while the linear address set in the register DR0 is being accessed, bit B0 of the debug register DR6 is set to "1."

Meanwhile, since the port 60*h* of the keyboard input/output port 130 is designated in the register DR0 in an exemplary embodiment of the present invention, the security-exception handler registered in vector 1 of the interrupt-descriptor table 200 at a state in which bit B0 (bit zero) of the debug register DR6 is set is invoked when anyone accesses the port 60*h*.

Figure 13:
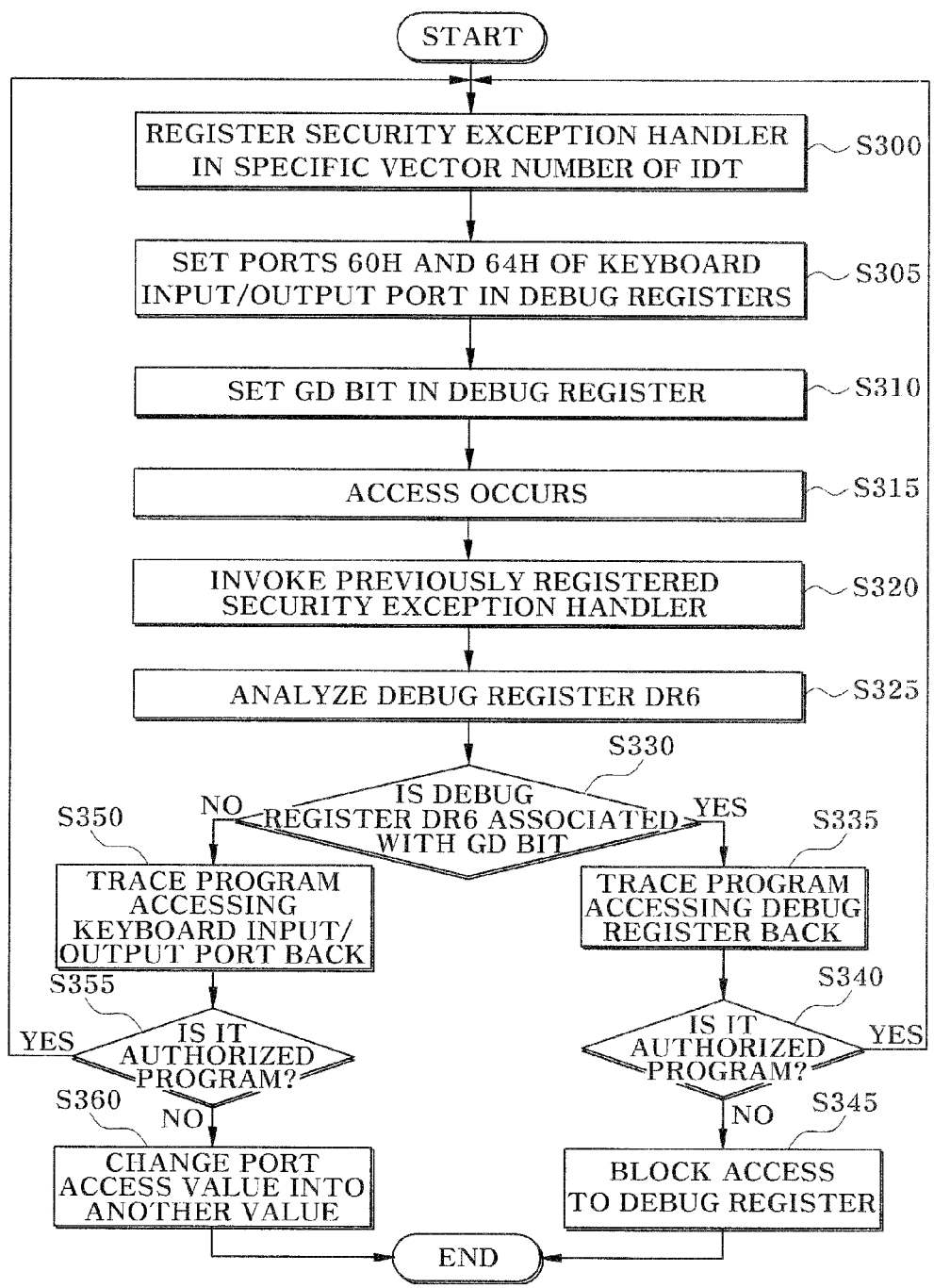
FIG. 13 is a flowchart illustrating a process of solving a problem of security deterioration due to a polling attack in a keyboard-input information-security apparatus according to an exemplary embodiment of the present invention.

FIG. 13 is a flowchart illustrating a process of solving a problem of security deterioration due to a polling attack in a keyboard-input information-security apparatus according to an exemplary embodiment of the present invention.

Referring to FIG. 13, when the keyboard-input information-security apparatus according to an exemplary embodiment of the present invention has been activated, the security-exception handler is registered in a specific vector number (preferably, vector 1) of the interrupt-descriptor table 200 (S300), the ports 60*h* and 64*h* of the keyboard input/output port 130 are set in any one of the debug registers DR0 to DR3 (S305), and the GD (thirteenth) bit of the register DR7 among the debug register DR0 to DR7 is set to a specific value (preferably, "1") (S310) in order to defend against a port-polling attack or block an action trying to change a setting in the debug register.

When the keyboard input/output port 130 or the debug register is accessed by a polling-attack program or any other program as shown in FIGS. 7 and 8 (S315), an exception occurs and the security-exception handler registered previously in step S300 is invoked (S320).

The security-exception handler invoked in step S320 analyzes the debug register DR6 among the debug registers (S325) to determine whether the debug register DR6 is associated with the GD bit of the register DR7 (S330).

When it is determined in step S330 that the debug register DR6 is associated with the GD bit of the register DR7, i.e., bit BD (the thirteenth bit) of the debug register DR6 is set to a specific value (preferably, "1"), the security-exception handler traces the program accessing the debug register back (S335) and determines whether the accessing program is an authorized program or an unauthorized program (S340). When the accessing program is an unauthorized program, the security-exception handler blocks access to the debug register (S345) and otherwise, the security-exception handler returns to step S300.

In this case, the determination as to whether the accessing program is an authorized program or an unauthorized program is made through a comparison of an address at which a fault is generated. For example, when the address is not in i8042prt.sys (PS/2 port driver) or the security area according to the present invention, it is determined that the accessing program is an unauthorized program.

Here, the program that had accessed the debug register may be traced back as follows: The CPU 150 has EAX, EBX, EDX, and EIP registers, as well as the debug and control registers. The EIP register is an instruction pointer for pointing a location of program-instruction code currently executed by the CPU 150. The EIP register is pushed into the stack at a point in time when the security-exception handler is invoked and popped from the stack at a point in time when the security-exception handler is terminated.

For example, if an instruction "mov dr0, 0x60" to access the debug register exists in a process "ABCD" and is located at "0x80000000" in the memory, an EIP value when the instruction is processed by the CPU 150 is "0x80000000" and the exception occurs at this instant, such that the EIP value "0x80000000" is pushed into the stack.

After the exception is handled by the security-exception handler, the EIP value is popped from the stack to have "0x80000000" and an instruction that was to be processed prior to the exception occurrence is normally processed. The security-exception handler may obtain the location of the program-execution code being executed by the CPU 150 directly before the security-exception handler is invoked, by checking the EIP value pushed into the stack.

For example, when an area of i8042ptr.sys (PS/2 port driver) process ranges from 0xf75e7000 to 0xf75f2f00 and the EIP value pushed into the stack obtained by the security-exception handler ranges from 0xf75e7000 to 0xf75f2f00, it may be considered an exception occurring due to the i8042prt.sys process. If the area is not a permitted-process area, the access to the debug register may be blocked by changing the EIP value, which has been pushed into the stack, to skip to a next instruction.

On the other hand, when it is determined in step S330 that the debug register DR6 is not associated with the GD bit of the register DR7, i.e., when at least one of bit B0 to B3 (bit zero to bit three) of the debug register DR6 is set to a specific value (preferably, "1"), the security-exception handler traces a program accessing the keyboard input/output port back (S350) and determines whether the accessing program is an authorized program or an unauthorized program (S355). When the accessing program is an unauthorized program, the security-exception handler changes the port access value into another value (S360), and otherwise, the security-exception handler returns to step S300.

In this case, the determination as to whether the accessing program is an authorized program or an unauthorized program is made through a comparison of an address at which a trap is generated. For example, when the address is not in i8042prt.sys (PS/2 port driver) or the security area according to the present invention, it is determined that the accessing program is an unauthorized program.

Here, the program accessing the input/output port is traced back using the same method for tracing the program accessing the debug register back, and the CPU 150 has EAX, EBX, EDX, and EIP registers, as well as the above-described debug and control registers.

The EIP register is an instruction pointer for pointing a location of program-instruction code currently executed by the CPU 150. The EIP register is pushed into the stack at a point in time when the security-exception handler is invoked and popped from the stack at a point in time when the security-exception handler is terminated.

For example, if an instruction "in a1, 0x60" to access the keyboard input/output port exists in a process "ABCD" and is located at "0x80000000" in the memory, an EIP value when the instruction is processed by the CPU 150 is "0x80000000" and the exception occurs directly after the instruction is processed, such that the EIP value "0x800000XY" is pushed into the stack.

Here, XY is a length of the instruction. Port access exception (trap) occurs directly after the instruction has been executed, unlike the exception (fault) through the GD bit of the debug register. Accordingly, the EIP value pushed into the stack points an instruction subsequent to "port access instruction."

After the exception is handled, the EIP value is popped from the stack to have "0x800000XY" and an instruction that was to be processed prior to the exception occurrence is normally processed. Accordingly, the security-exception handler may obtain a location of program-execution code being executed by the CPU 150 directly before the security-exception handler is invoked, by checking the EIP value pushed into the stack.

For example, when an area of i8042ptr.sys (PS/2 port driver) process ranges from 0xf75e7000 to 0xf75f2f00 and the EIP value pushed into the stack obtained by the security-exception handler ranges from 0xf75e7000 to 0xf75f2f00, it may be considered an exception occurring due to the i8042prt.sys process. If the area is not a permitted-process area, the access to the keyboard input/output port may be blocked by changing a value of the EAX register in which a currently accessed value is stored, into any meaningless data.

Meanwhile, when the keyboard-input information-security according to an exemplary embodiment of the present invention is terminated, it is desirable that the temporally stored interrupt descriptor table 200 and original values set in the debug register of the CPU 150 be restored.

As described above, in the present invention, when one maliciously attempts to access the keyboard input/output port 130 of the keyboard-input device 100, the CPU 150 can generate a trap. Accordingly, the CPU 150 acquires a control right directly before a malicious program acquires a value obtained by accessing the keyboard input/output port 130.

That is, the CPU 150 halts the access task upon sensing a port-access instruction and invokes a trap-handler function (or a monitoring function) i.e., the security-exception handler, set in vector 1 of the interrupt-descriptor table 200. The secure input-device driver 300 can effectively monitor port polling, e.g., an action trying to change the value in the debug register, by registering the security-exception handler in vector 1 of the interrupt-descriptor table 200.

Meanwhile, a program for performing the keyboard-input information-security method according to an exemplary embodiment of the present invention may be stored in a recording medium such as a compact disk (CD), a floppy diskette, or a memory stick, to be sold as goods, and installed in a computer offline by a user. The present invention may be applied when any program or a specific program is used. Alternatively, the program for performing the keyboard-input information-security method according to the present invention may be downloaded as a file automatically or by a user's selection when the user accesses a specific site via the Internet, and installed. The program may be executed when the user inputs data via the keyboard-input device to send information to a web site through a web browser such as Internet Explorer.

The keyboard-input information-security apparatus and method according to the present invention as described above can provide a higher-level security than a conventional keyboard-security scheme, and effectively block keyboard-input information from being practically taken by hacking with an information-intrusion tool while the keyboard-input information is being processed, by changing keyboard-interrupt-vector information delivered when a keyboard interrupt is generated by a keyboard-input device.

Furthermore, the apparatus and method can effectively block a port-polling attack or an action trying to change a setting in a debug register of a central processing unit (CPU), by setting a specific value in the debug register and monitoring the specific value for security.

It will be apparent to those skilled in the art that various modifications can be made to the above-described exemplary embodiments of the present invention without departing from the spirit or scope of the invention. Thus, it is intended that the present invention cover all such modifications provided they come within the scope of the appended claims and their equivalents.

What is claimed is:

1. A keyboard-input information-security apparatus comprising:
   an interrupt-descriptor table for storing a list of addresses of functions for handling interrupts, and storing an address of a secure input-interrupt service routine at a specific location in an address area for an operating-system input interrupt-service routine supported by an operating system;
   a secure input-device driver for changing keyboard-interrupt-vector information to invoke the address of the secure input interrupt-service routine when a keyboard interrupt is generated by a keyboard-input device, and receiving and encoding data input via the keyboard-input device based on the address of the secure input interrupt-service routine; and a secure input unit for delivering the encoded data from the secure input-device driver to an application program, wherein the secure input-device driver sets a GD (thirteenth) bit of a debug register DR7 among debug registers DR0 to DR7 to a specific value and sets a keyboard input/output port in at least one of registers DR0 to DR3 in order to defend against a port-polling attack, and wherein when a security-exception handler is registered in a vector number of the interrupt-descriptor table corresponding to the specific value and the debug register is accessed, an exception occurs and the registered security-exception handler is invoked, and wherein the security-exception handler analyzes the debug register DR6 among the debug registers, determines whether an accessing program is an authorized program or an unauthorized program depending on association with the GD bit, and controls to permit or block the access depending on the determination result.

2. The apparatus of claim 1, wherein the secure input-device driver comprises:

a data receiver for receiving the data input from the keyboard-input device when the keyboard interrupt is generated by the keyboard-input device;

an encoder for encoding the data received by the data receiver;

a monitor for monitoring a change in the address of the secure input interrupt-service routine that is registered in the interrupt-descriptor table; and a controller for changing the keyboard-interrupt-vector information to invoke the address of the secure input interrupt-service routine when the keyboard interrupt is generated by the keyboard-input device, and controlling operation of the secure input-device driver.

3. The apparatus of claim 2, wherein the address of the secure input interrupt-service routine is an address of the data receiver.

4. The apparatus of claim 2, wherein the monitor monitors a change in the keyboard-interrupt-vector information and access to a keyboard input/output port.

5. The apparatus of claim 1, wherein when bit BD (the thirteenth bit) of the debug register DR6 among the debug registers has been set to the specific value as a result of analyzing the register DR6, the security-exception handler traces a program accessing the debug register back to determine whether the accessing program is an authorized program or an unauthorized program, and blocks the access to the debug register when the accessing program is an unauthorized program, and when at least one of bits B0 to B3 (bit zero to bit three) of the debug register DR6 has been set to the specific value, the security-exception handler traces a program accessing a keyboard input/output port back to determine whether the accessing program is an authorized program or an unauthorized program, and controls to change a port-access value into another value when the accessing program is an unauthorized program.

6. The apparatus of claim 1, wherein the specific value is "1" and the security-exception handler is set in vector 1 of the interrupt-descriptor table.

7. A keyboard-input information-security method comprising:

storing an address of a secure input interrupt-service routine at a specific location in an address area for an operating-system input interrupt-service routine supported by an operating system in an interrupt-descriptor table that stores a list of addresses of functions for handling interrupts;

changing keyboard-interrupt-vector information to invoke the address of the secure input interrupt-service routine when a keyboard interrupt is generated by a keyboard-input device, and executing the secure input interrupt-service routine based on the address of the secure input interrupt-service routine previously registered in the interrupt-descriptor table, wherein the secure input interrupt-service routine comprises fetching and encoding data input by the keyboard-input device;

setting a GD (thirteenth) bit of a debug register DR7 among debug registers DR0 to DR7 to a specific value, setting a keyboard input/output port in at least one of registers DR0 to DR3, and registering a security-exception handler in a vector number of the interrupt-descriptor table corresponding to the specific value, in order to defend against a port-polling attack, wherein an exception occurs and the registered security-exception handler is invoked when the debug register is accessed; and analyzing, using the security-exception handler, the debug register DR6 among the debug registers, to determine whether an accessing program is an authorized program or an unauthorized program depending on association with the GD bit, and permitting or blocking the access depending on the determination result.

8. The method of claim 7, further comprising monitoring a change in the address of the secure input interrupt-service routine registered previously in the interrupt-descriptor table.

9. The method of claim 7, further comprising decoding the encoded data and transmitting the decoded data to an application program.

10. The method of claim 7, further comprising monitoring a change in the keyboard-interrupt-vector information and access to a keyboard input/output port.

11. The method of claim 7, wherein:

when bit BD (the thirteenth bit) of the debug register DR6 among the debug registers has been set to the specific value as a result of analyzing the register DR6, tracing, using the security-exception handler, a program accessing the debug register back to determine whether the accessing program is an authorized program or an unauthorized program, and blocking the access to the debug register when the accessing program is an unauthorized program, and when at least one of bits B0 to B3 (bit zero to bit three) of the debug register DR6 has been set to the specific value, tracing, using the security-exception handler, a program accessing a keyboard input/output port back to determine whether the accessing program is an authorized program or an unauthorized program, and changing a port-access value into another value when the accessing program is an unauthorized program.

12. The method of claim 7, wherein the specific value is "1" and the security-exception handler is set in vector 1 of the interrupt-descriptor table.

13. A non-transitory computer-readable recording medium having a program recorded thereon for causing a suitably programmed computer to perform a method comprising:

storing an address of a secure input interrupt-service routine at a specific location in an address area for an operating-system input interrupt-service routine supported by an operating system in an interrupt-descriptor table that stores a list of addresses of functions for handling interrupts;

changing keyboard-interrupt-vector information to invoke the address of the secure input interrupt-service routine when a keyboard interrupt is generated by a keyboard-input device, and executing the secure input interrupt-service routine based on the address of the secure input interrupt-service routine previously registered in the interrupt-descriptor table, wherein the secure input interrupt-service routine comprises fetching and encoding data input by the keyboard-input device;

setting a GD (thirteenth) bit of a debug register DR7 among debug registers DR0 to DR7 to a specific value, setting a keyboard input/output port in at least one of registers DR0 to DR3, and registering a security-exception handler in a vector number of the interrupt-descriptor table corresponding to the specific value, in order to defend against a port-polling attack, wherein an exception occurs and the registered security-exception handler is invoked when the debug register is accessed, and analyzing, in the security-exception handler, the debug register DR6 among the debug registers to determine whether an accessing program is an authorized program or an unauthorized program depending on association with the GD bit, and permitting or blocking the access depending on the determination result.

14. The computer-readable recording medium of claim 13, further comprising instructions stored thereon that cause the method to further include:

monitoring a change in the address of the secure input interrupt-service routine registered previously in the interrupt-descriptor table; and decoding the encoded data and transmitting the decoded data to an application program.

15. The computer-readable recording medium of claim 13, further comprising instructions stored thereon that cause the method to further include:

monitoring a change in the keyboard-interrupt-vector information and access to a keyboard input/output port.

16. The computer-readable recording medium of claim 13, further comprising instructions stored thereon that cause the method to further include:

when bit BD (the thirteenth bit) of the debug register DR6 among the debug registers has been set to the specific value as a result of analyzing the register DR6:
  tracing, using the security-exception handler, a program accessing the debug register back to determine whether the accessing program is an authorized program or an unauthorized program, and blocking the access to the debug register when the accessing program is an unauthorized program, and when at least one of bits B0 to B3 (bit zero to bit three) of the debug register DR6 has been set to the specific value:
  tracing, using the security-exception handler, a program accessing a keyboard input/output port back to determine whether the accessing program is an authorized program or an unauthorized program, and changing a port-access value into another value when the accessing program is an unauthorized program.

17. The computer-readable recording medium of claim 13, wherein the specific value is "1" and the security-exception handler is set in vector 1 of the interrupt-descriptor table.

* * * * *